United States Patent
Miracle et al.

(10) Patent No.: US 10,041,024 B2
(45) Date of Patent: Aug. 7, 2018

(54) BIS-AZO COLORANTS FOR USE AS BLUING AGENTS

(71) Applicant: The Procter & Gamble Company, Cincinnati, OH (US)

(72) Inventors: Gregory Scot Miracle, Liberty Township, OH (US); Daniel Dale Ditullio, Jr., Hamilton, OH (US); Sanjeev Kumar Dey, Spartanburg, SC (US); Eduardo (N M N) Torres, Greer, SC (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 15/629,899

(22) Filed: Jun. 22, 2017

(65) Prior Publication Data

US 2017/0283746 A1    Oct. 5, 2017

Related U.S. Application Data

(63) Continuation of application No. 15/009,858, filed on Jan. 29, 2016, now Pat. No. 9,719,056.

(51) Int. Cl.
*C11D 3/42* (2006.01)
*C11D 3/386* (2006.01)
*C11D 3/00* (2006.01)

(52) U.S. Cl.
CPC .............. *C11D 3/42* (2013.01); *C11D 3/0021* (2013.01); *C11D 3/38627* (2013.01)

(58) Field of Classification Search
CPC ........ C11D 3/37; C11D 3/38627; C11D 3/395; C11D 3/42
See application file for complete search history.

(56) References Cited

U.S. PATENT DOCUMENTS

| 9,719,056 B1* | 8/2017 | Miracle .................... C11D 3/42 |
| 2012/0101018 A1 | 4/2012 | Miracle et al. |
| 2012/0101265 A1 | 4/2012 | Mahaffey, Jr. et al. |

FOREIGN PATENT DOCUMENTS

| WO | WO 2010/151906 | * 12/2010 | .......... C09B 31/065 |
| WO | WO 2010/151906 A2 | 12/2010 | |

OTHER PUBLICATIONS

International Search Report; International Application No. PCT/US2017/013733; dated Apr. 3, 2017; 12 pages.

* cited by examiner

*Primary Examiner* — Brian P Mruk
(74) *Attorney, Agent, or Firm* — John T. Dipre; Steven W. Miller

(57) ABSTRACT

This invention relates to bis-azo colorants for use as bluing agents, laundry care compositions comprising bis-azo colorants that may serve as bluing agents, processes for making such bluing agents and laundry care compositions and methods of using the same. The bluing agents are generally comprised of at least two components: at least one chromophore component and at least one polymeric component. These bluing agents are advantageous in providing a whitening effect to fabrics, while not building up over time and causing undesirable blue discoloration to the treated fabrics.

16 Claims, No Drawings

BIS-AZO COLORANTS FOR USE AS BLUING AGENTS

The instant application is a continuation of Ser. No. 15/009,858, filed Jan. 29, 2016, now U.S. Pat. No. 9,719,056.

TECHNICAL FIELD

This invention relates to bis-azo colorants for use as bluing agents, laundry care compositions comprising bis-azo colorants that may serve as bluing agents, processes for making such bluing agents and laundry care compositions and methods of using the same. The bluing agents are generally comprised of at least two components: at least one chromophore component and at least one polymeric component selected from a polyalkyleneoxy and a capped polyalkyleneoxy. These bluing agents are advantageous in providing a whitening effect to fabrics.

BACKGROUND

As textile substrates age, their color tends to fade or yellow due to exposure to light, air, soil, and natural degradation of the fibers that comprise the substrates. Thus, the purpose of bluing agents is generally to maintain the whiteness perception of these textile substrates and counteract the fading and yellowing of the substrates. Typically, bluing agents may be found in laundry detergents, fabric softeners, or rinse aids and are therefore applied to textile substrates during the laundering process. However, it is important that bluing agents function to improve the whiteness perception of treated textile substrates without causing undesirable staining of the textile substrates. Cellulosic substrates, in particular, tend to exhibit a yellow hue after exposure to light, air, and/or soiling. This yellowness is often difficult to reverse by normal laundering procedures. As a result, there exists a need for improved bluing agents which are capable of eliminating the yellowness exhibited by ageing cellulosic substrates. By utilizing such improved bluing agents, the life of the textile substrates, such as clothing articles, table linens, etc., may be extended. Domestic washes contain a mixture of fabric types and in the application of bluing agents care must be taken so that dye build up does not occur on fabric types other than cotton. Unfortunately, current bluing agents that deposit efficiently on cotton can deposit too strongly on nylon, especially at higher temperatures, thus over hueing the treated situs over multiple treatment cycles. There is a thus containing need for bluing agents that have improved selectivity for deposition on cotton over other fabric types, such as nylon.

The present invention offers advantages over previous efforts in this area, as this invention takes advantage of compounds having a non-sulfonic acid substituent in either the terminal and/or central phenyl ring of the bis-azo structure. Sulfonic acid groups are known to promote the deposition and staining of acid dyes on cellulosic fabrics. These groups are also essential for the solubility and compatibility of the dyes in laundry formulations. While it is necessary that bluing agents deposit from wash water, it is undesirable that they stain the fabric by inadvertent contact or by building up over time, i.e. overhueing. Applicants recognized that modification or replacement of the sulfonic acid group at the phenyl terminal end of the bis-azo with a nonionic solubilizing group allows for good deposition of the bis-azo but attenuates its staining and overhueing tendencies and still allows the bluing agent to be compatible in laundry formulations. Applicants further recognized that the selection of the terminal coupler significantly impacts the selectivity ratio and enables the intentional construction of dyes highly selective for cotton over nylon. In short, Applicants recognized the source of the current hueing deficiencies and herein provide the solution to such problem. The hueing compounds disclosed herein also absorb light at a wavelength appropriate to neutralize the yellowness of cellulosic substrates. These compounds function ideally as bluing agents for cellulosic substrates and may be incorporated into laundry care compositions for use by consumers.

SUMMARY OF INVENTION

This invention relates to laundry care compositions comprising bis-azo colorants that may serve as bluing agents, processes for making such laundry care compositions and methods of using the same. The bluing agents are generally comprised of at least two components: at least one chromophore component and at least one polymeric component selected from a polyalkyleneoxy and a capped polyalkyleneoxy. These bluing agents are advantageous in providing a whitening effect to fabrics, while not building up over time and causing undesirable blue discoloration to the treated fabrics.

DETAILED DESCRIPTION

As used herein, the term "alkoxy" is intended to include $C_1$-$C_6$ alkoxy and alkoxy derivatives of polyols having repeating units such as butylene oxide, glycidol oxide, ethylene oxide or propylene oxide.

As used herein, the terms "alkyl" and "alkyl capped" are intended to include $C_1$-$C_6$ alkyl groups.

The terms "ethylene oxide," "propylene oxide" and "butylene oxide" may be shown herein by their typical designation of "EO," "PO" and "BO," respectively.

As used herein, the term "laundry care composition" includes, unless otherwise indicated, granular, powder, liquid, gel, paste, unit dose, bar form and/or flake type washing agents and/or fabric treatment compositions.

As used herein, the term "fabric treatment composition" includes, unless otherwise indicated, fabric softening compositions, fabric enhancing compositions, fabric freshening compositions and combinations thereof. Such compositions may be, but need not be rinse added compositions.

As used herein, "cellulosic substrates" are intended to include any substrate which comprises at least a majority by weight of cellulose. Cellulose may be found in wood, cotton, linen, jute, and hemp. Cellulosic substrates may be in the form of powders, fibers, pulp and articles formed from powders, fibers and pulp. Cellulosic fibers, include, without limitation, cotton, rayon (regenerated cellulose), acetate (cellulose acetate), triacetate (cellulose triacetate), and mixtures thereof. Articles formed from cellulosic fibers include textile articles such as fabrics. Articles formed from pulp include paper.

As used herein, the articles including "the", "a" and "an" when used in a claim, are understood to mean one or more of what is claimed or described.

As used herein, the terms "include", "includes" and "including" are meant to be non-limiting.

As used herein, the terms "polyalkyleneoxy" and "polyoxyalkylene" are meant to be interchangeable.

The test methods disclosed in the Test Methods Section of the present application should be used to determine the respective values of the parameters of Applicants' inventions.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All documents cited are, in relevant part, incorporated herein by reference; the citation of any document is not to be construed as an admission that it is prior art with respect to the present invention.

Suitable Bluing Agents

The bluing agents employed in the present laundry care compositions may be dyes, pigments, or polymeric colorants comprising a chromophore constituent and a polymeric constituent covalently bound to one another. The chromophore constituent is characterized in that it absorbs light in the wavelength range of blue, red, violet, purple, or combinations thereof upon exposure to light. In one aspect, the chromophore constituent exhibits an absorbance spectrum maximum from about 520 nanometers to about 640 nanometers in water and/or methanol, and in another aspect, from about 560 nanometers to about 610 nanometers in water and/or methanol.

Examples of suitable polymeric constituents include polyoxyalkylene chains having multiple repeating units. In one aspect, the polymeric constituents include polyoxyalkylene chains having from 2 to about 30 repeating units, from 2 to about 20 repeating units, from 2 to about 10 repeating units or even from about 3 or 4 to about 6 repeating units. Non-limiting examples of polyoxyalkylene chains include ethylene oxide, propylene oxide, glycidol oxide, butylene oxide and mixtures thereof.

In one aspect, the bluing agent employed in the present laundry care compositions may be selected from the following general structures (I-IV):

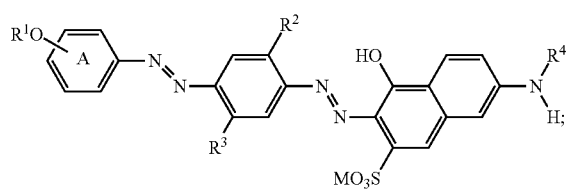

(I)

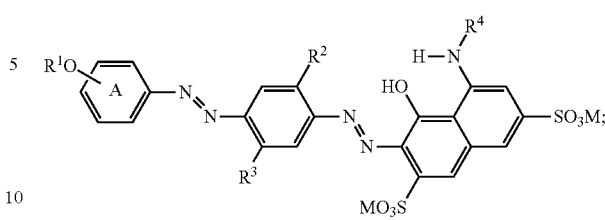

(II)

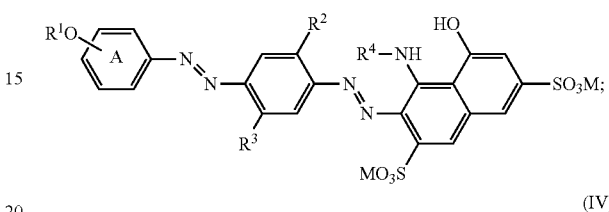

(III)

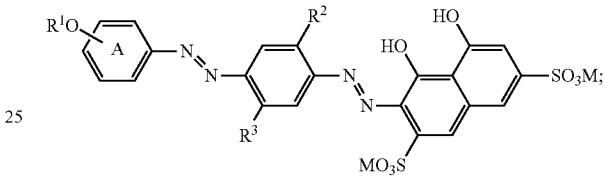

(IV)

and mixtures thereof;

wherein:

$R^1$ is selected from H, alkyl, hydroxyalkyl, polyalkyleneoxy and capped polyalkyleneoxy; $R^2$ and $R^3$ are independently selected from the group consisting of H, alkyl, alkoxy, alkyleneoxy, capped alkyleneoxy, polyalkyleneoxy and capped polyalkyleneoxy; $R^4$ is selected from H, C(O)H and $C(O)R^5$; wherein $R^5$ is independently selected from the group consisting of $C_{1-7}$ alkyl, $C_{6-10}$ aryl, and $C_{7-11}$ arylalkyl; wherein said capping groups are independently selected from $C(O)R^5$ and $R^5$; wherein the A ring may be further substituted with one or more groups selected from the group consisting of $C_{1-8}$ alkyl, $C_{1-8}$ alkoxy, nitro and $OR^6$; wherein $R^6$ is selected from the group consisting of H, hydroxyalkyl, a polyalkyleneoxy and a capped polyalkyleneoxy; wherein each M is independently selected from the group consisting of an alkali metal cation, an ammonium ion and an alkaline earth metal cation.

In one aspect, said bluing agent may comprise a polyoxyalkylene chain having from 2 to about 100 repeating units.

In one aspect, said bluing agent may comprise a polyoxyalkylene chain having from 2 or even 4 to about 50 repeating units In one aspect, said bluing agent may comprise a polyoxyalkylene chain having from 2 or even 4 to about 30 repeating units.

In one aspect, said bluing agent may comprise a polyoxyalkylene chain having from 2 or even 4 to about 20 repeating units.

In one aspect, said bluing agent may comprise a polyoxyalkylene chain having from 2 or even 4 to about 10 repeating units.

In one aspect, bluing agent may comprise a polyoxyalkylene chain having from about 4 to about 6 repeating units.

In one aspect, bluing agent may comprise an alkoxylated bis-azo polymeric colorant.

In one aspect, bluing agent's chromophore may exhibit an absorbance spectrum maximum in water of from about 520 nanometers to about 640 nanometers.

In one aspect, said bluing agent's chromophore may exhibit an absorbance spectrum maximum in water of from about 560 nanometers to about 610 nanometers.

In one aspect, said bluing agent may exhibit an absolute hue angle in the range of 220° to 320°.

In aspect said, bluing agent may exhibit an absolute hue angle in the range of 240° to 310°.

In aspect said, bluing agent may exhibit an absolute hue angle in the range of 250° to 300°.

As will be appreciated by those skilled in the art, the above noted bluing agents will typically also include additional bluing agent compounds present at levels that are unlikely to significantly impact the above bluing agent's performance, as perceived by the average consumer. Such additional bluing agent compounds derive from the reagents, impurities therein, and the synthetic pathway employed to prepare the above noted bluing agents, as is well known to the ordinarily skilled artisan. Non-limiting examples of additional bluing agents, which could be classified as expected impurities, have been disclosed for other azo dye bluing agents, for example in U.S. patent application Ser. Nos. 14/747,099 and 14/877,060, which may be instructive to the unskilled artisan in understanding the nature of such additional bluing agents that could be expected in the instant invention. As will further be appreciated, when the additional bluing agent compounds are present at levels that may impact the above noted bluing agent's performance, as perceived by the average consumer, such additional bluing agent compounds may be removed or retained as desired.

By way of example, those skilled in the art realize that coupling reactions using H-acid derivatives can occur at two positions, with products represented by structures (II) and (III) above. For the purposes of the present invention, it is understood that compounds incorporating H-acid derivatives represented herein by one particular regioisomer are intended to include the alternate regioisomer as well. That is, any particular structure such as (II) above is intended to also disclose structure (III).

In one aspect of the invention, suitable bluing agents include, but are not limited to the following structures:

BA1

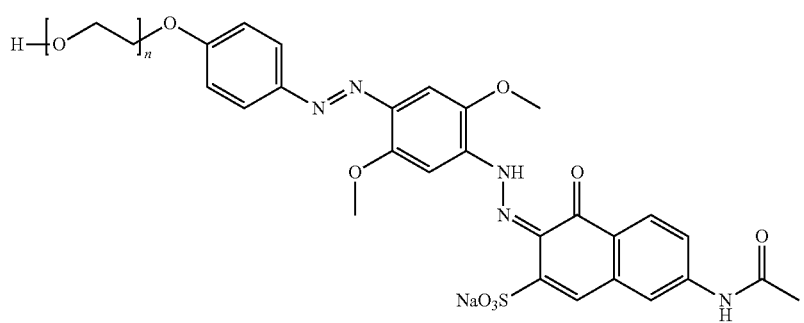

(n = 3-20, average ~10)

BA2

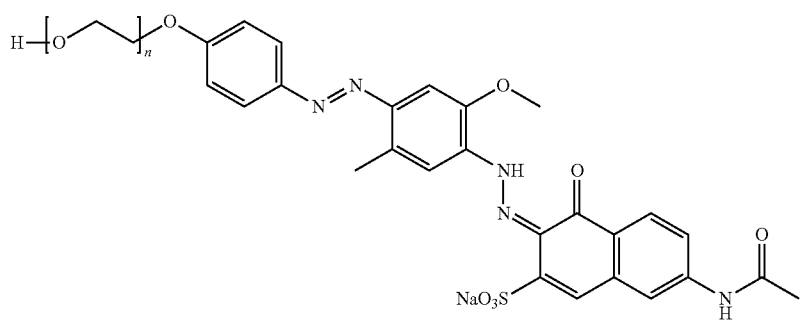

(n = 3-20, average ~10)

BA3

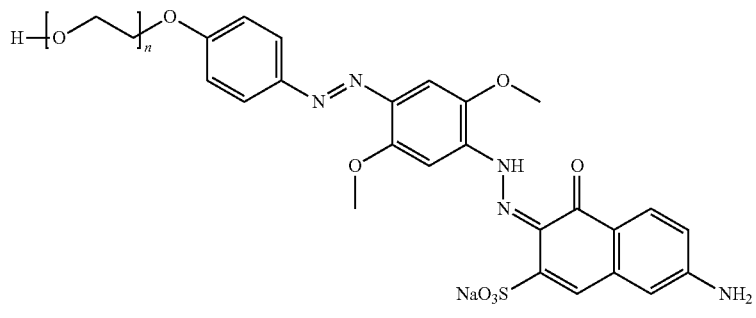

(n = 3-20, average ~10)

-continued
BA4
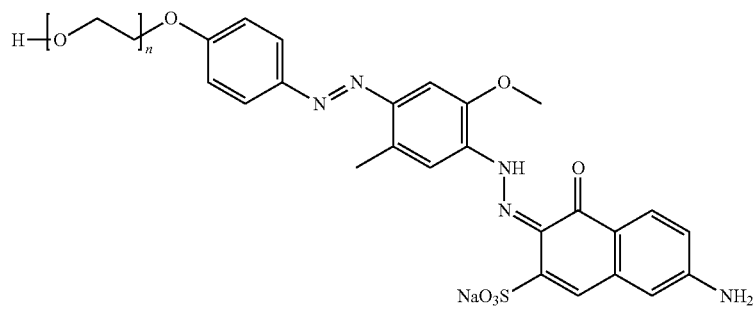
(n = 3-20, average ~10)
BA5
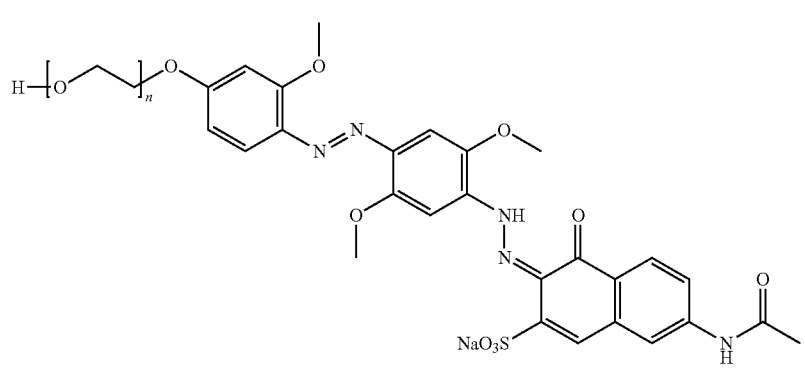
(n = 3-20, average ~10)
BA6
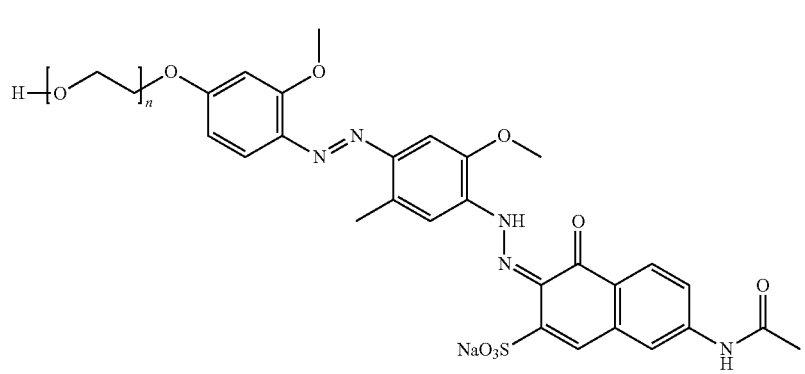
(n = 3-20, average ~10)
BA7
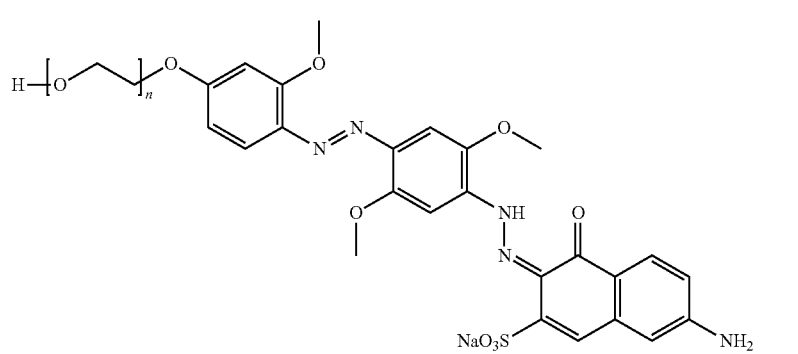
(n = 3-20, average ~10)

-continued
BA8
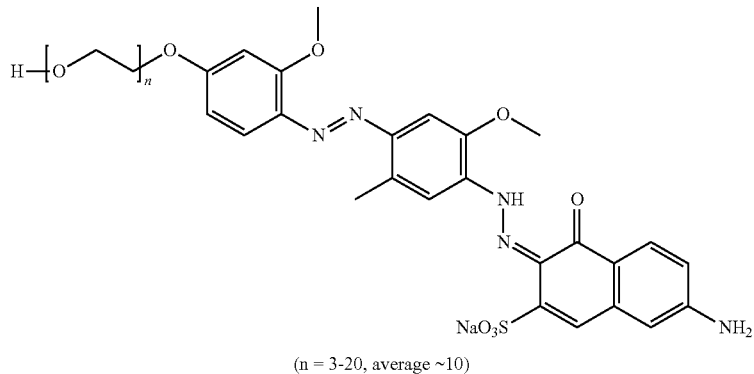
(n = 3-20, average ~10)
BA9
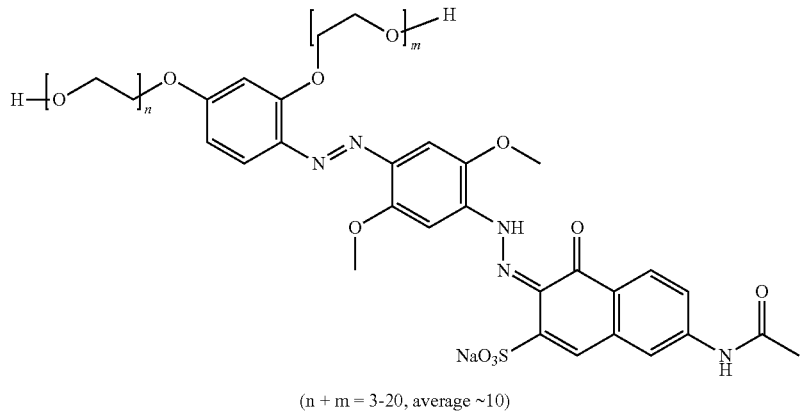
(n + m = 3-20, average ~10)
BA10
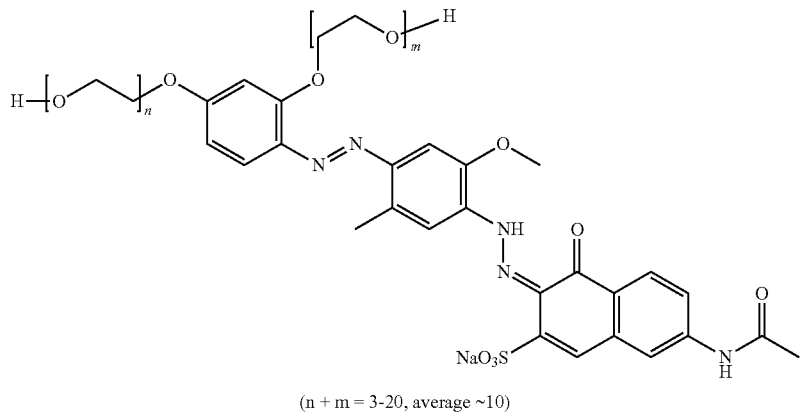
(n + m = 3-20, average ~10)
BA11
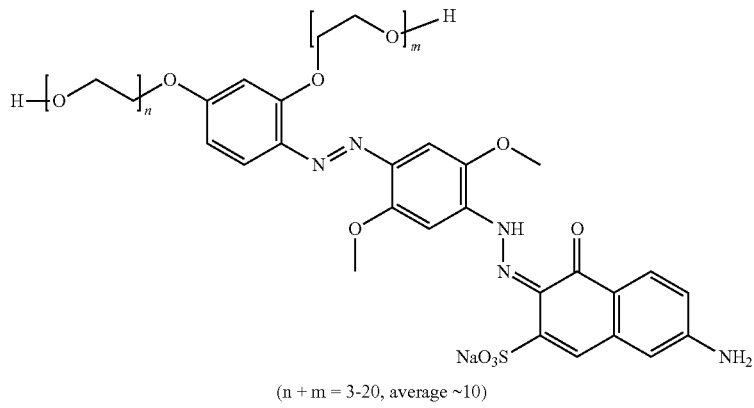
(n + m = 3-20, average ~10)

-continued
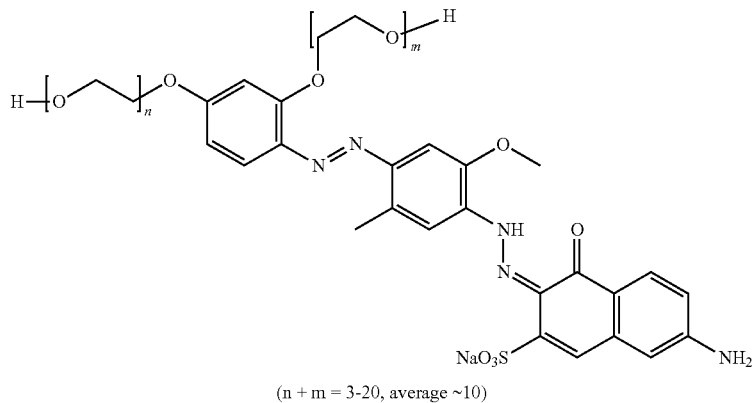
(n + m = 3-20, average ~10)
BA12
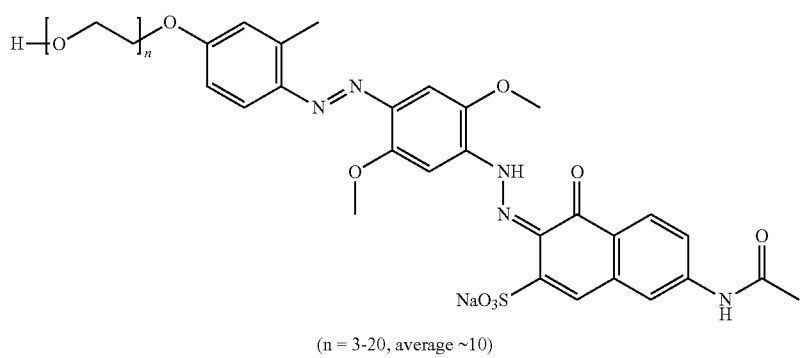
(n = 3-20, average ~10)
BA13
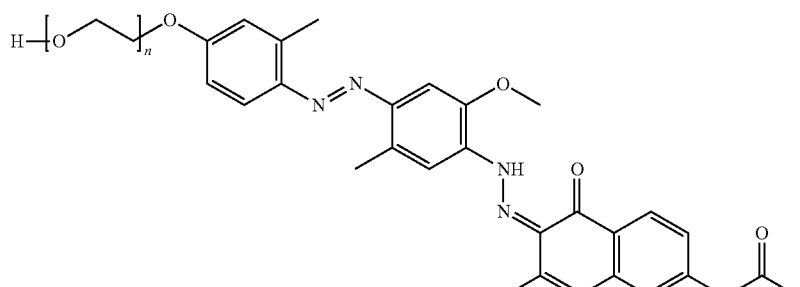
(n = 3-20, average ~10)
BA14
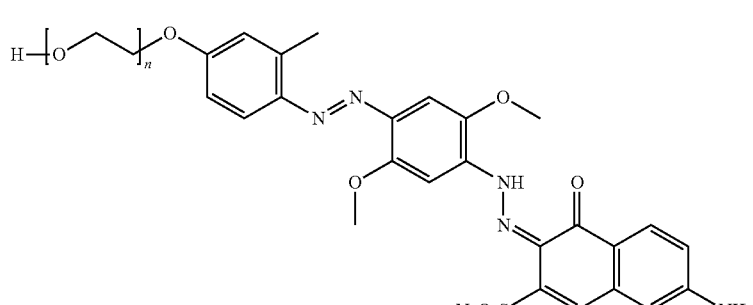
(n = 3-20, average ~10)
BA15

-continued
BA16
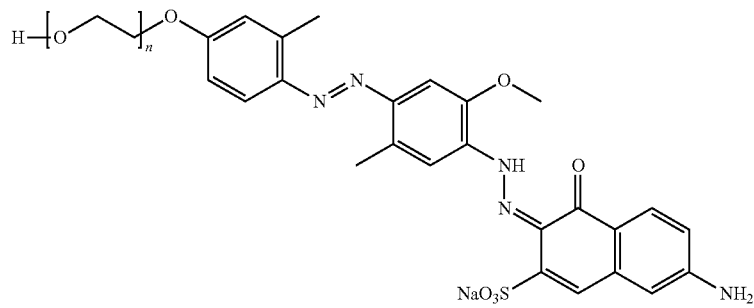
(n = 3-20, average ~10)
BA17
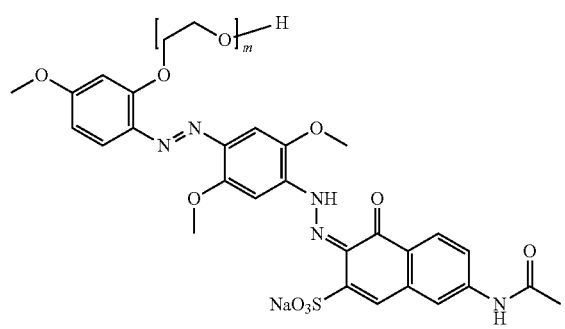
(m = 3-20, average ~10)
BA18
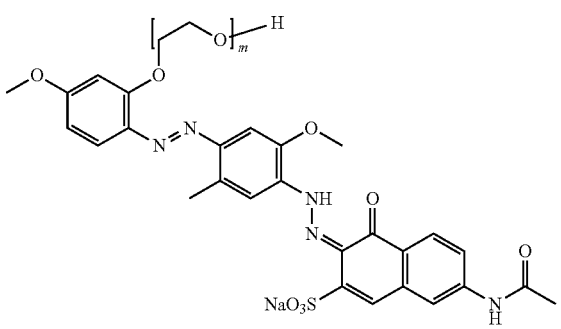
(m = 3-20, average ~10)
BA19
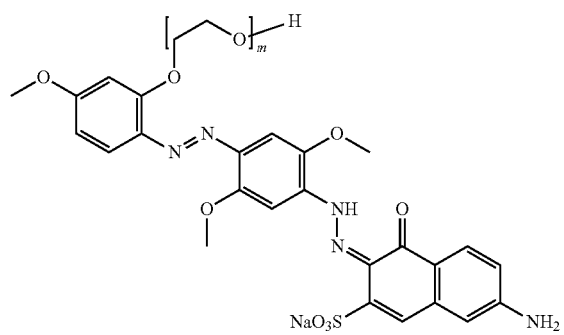
(m = 3-20, average ~10)
BA20
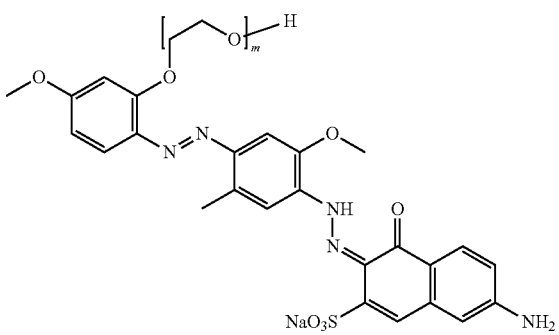
(m = 3-20, average ~10)
BA21
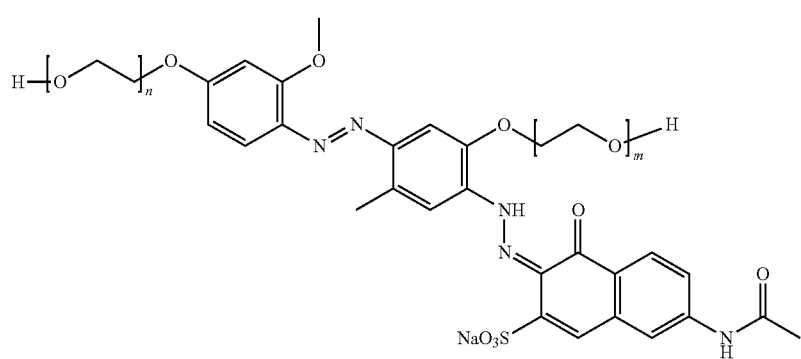
(n + m = 3-20, average ~10)

BA22
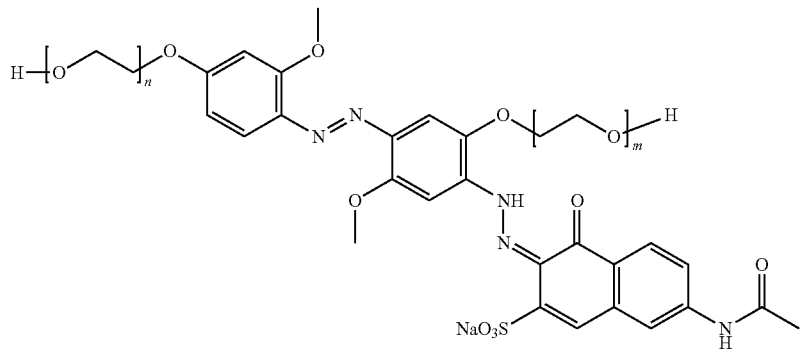
(n + m = 3-20, average ~10)
BA23
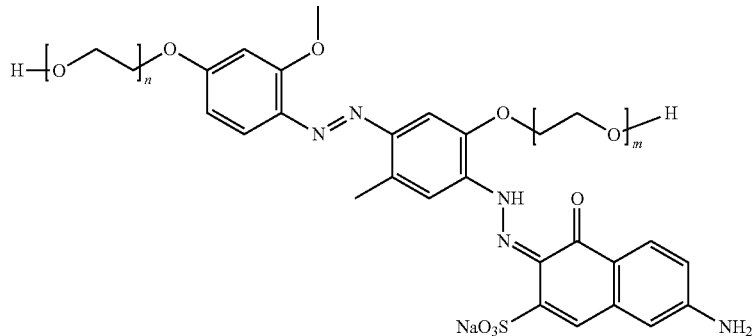
(n + m = 3-20, average ~10)
BA24
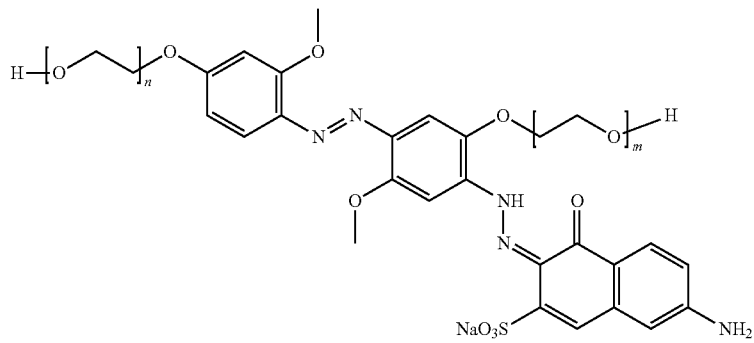
(n + m = 3-20, average ~10)
BA25
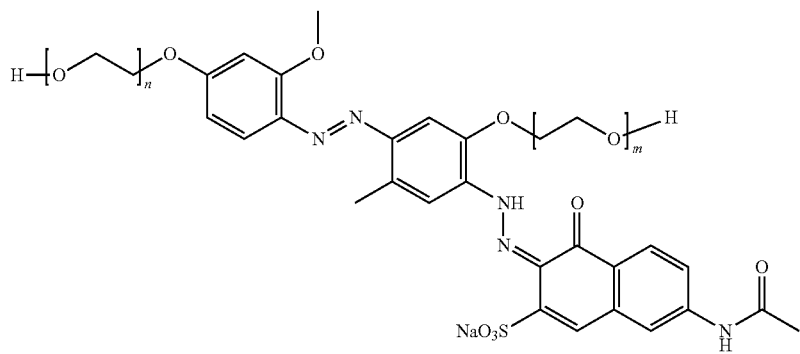
(n = 3-20, average ~10; m = 3-10, average ~5)

-continued
BA26
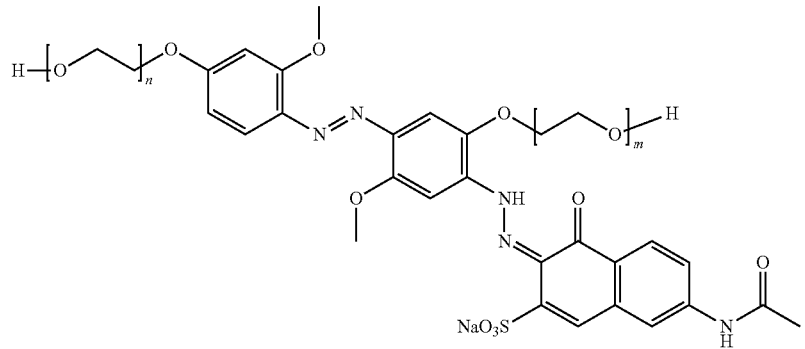
((n = 3-20, average ~10; m = 3-10, average ~5)
BA27
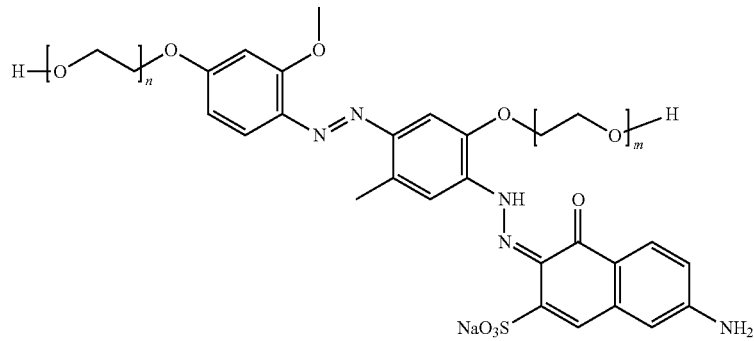
(n = 3-20, average ~10; m = 3-10, average ~5)
BA28
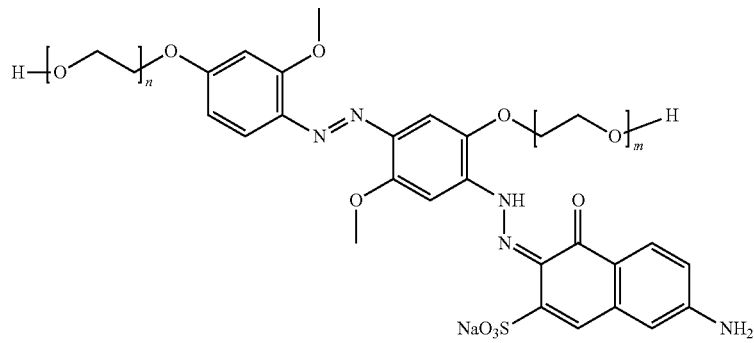
(n = 3-20, average ~10; m = 3-10, average ~5)
BA29
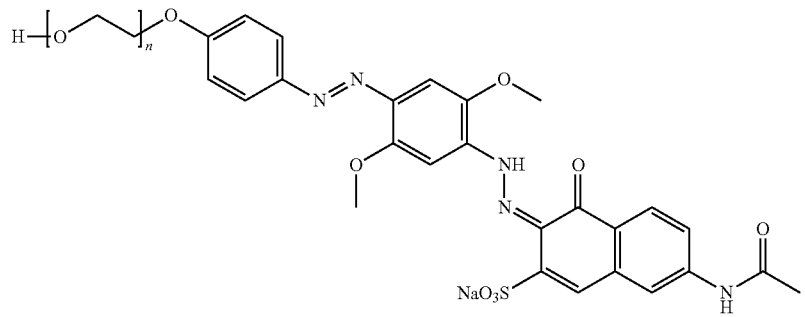
(n = 10-50, average ~30)

BA30
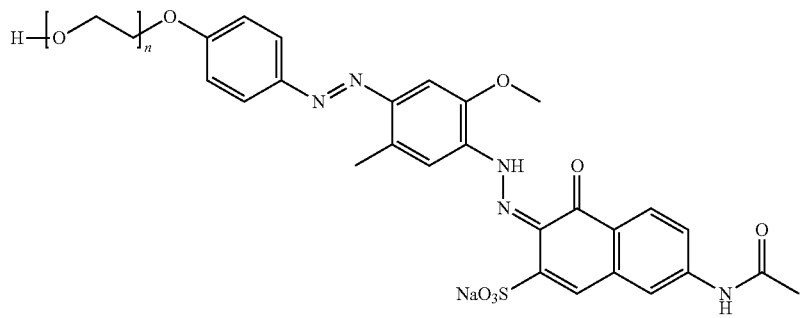
(n = 10-50, average ~30)
BA31
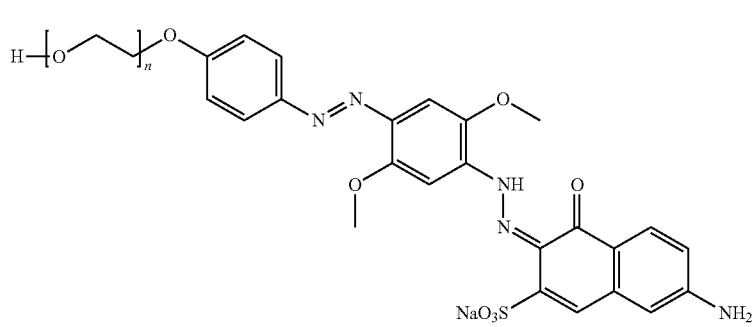
(n = 10-50, average ~30)
BA32
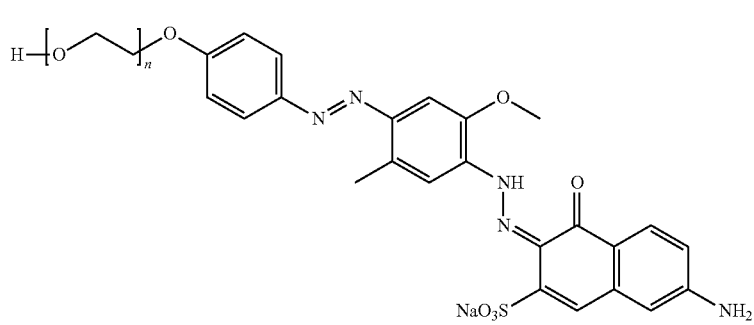
(n = 10-50, average ~30)
BA33
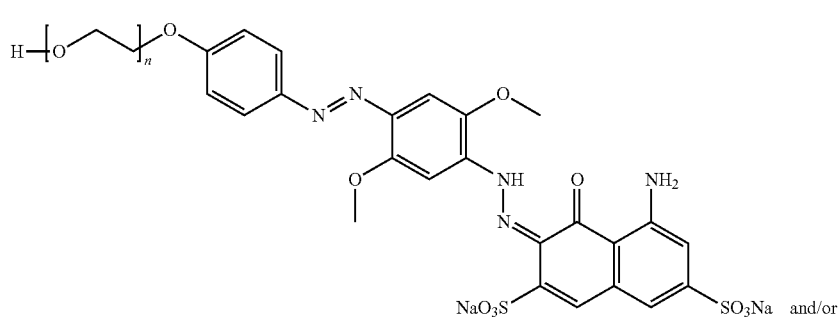
and/or

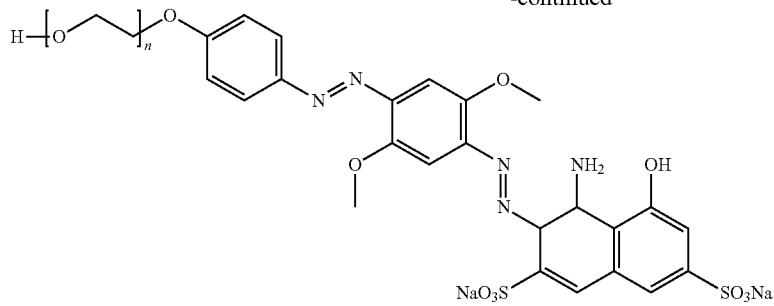
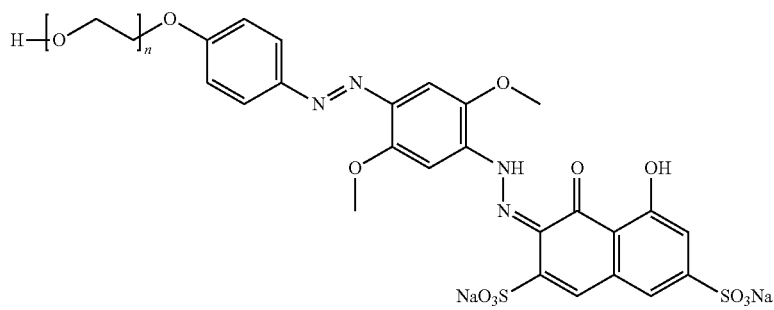
BA34
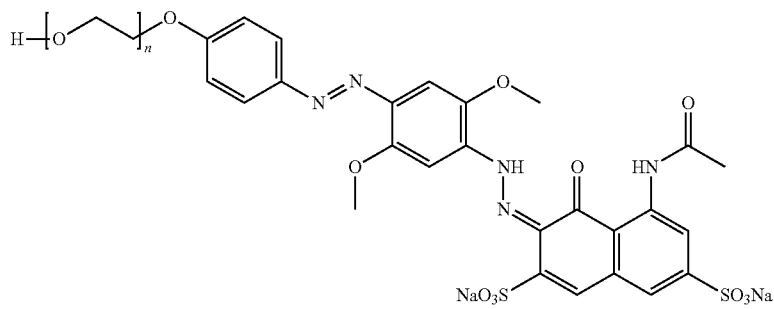
BA35
A suitable synthesis route for certain bis-azo colorants disclosed herein is shown below:
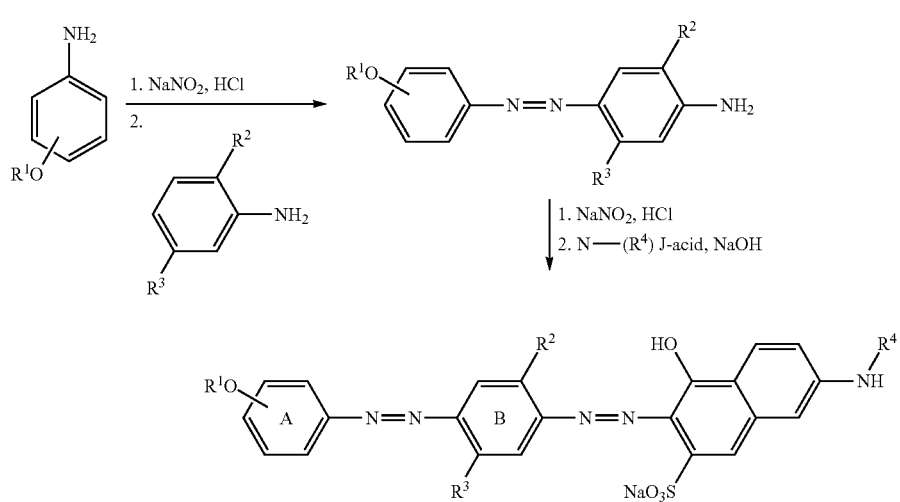
Wherein $R^1$ is selected from H, alkyl, hydroxyalkyl, polyalkyleneoxy and capped polyalkyleneoxy; $R^2$ and $R^3$ are independently selected from the group consisting of H, alkyl, alkoxy, alkyleneoxy, capped alkyleneoxy, polyalkyleneoxy and capped polyalkyleneoxy; $R^4$ is selected from H, C(O)H and C(O)$R^5$; wherein $R^5$ is independently selected from the group consisting of $C_{1-7}$ alkyl, $C_{6-10}$ aryl, and $C_{7-11}$ arylalkyl; wherein said capping groups are independently selected from C(O)$R^5$ and $R^5$. Similar related approaches may be employed when utilizing H-acid or chromotropic acid derivatives, as are well known in the art.

Suitable starting materials for the A ring include, but are not limited to, nitrophenols such as 5-methoxy-2-nitrophenol, 4-nitro-1,3-benzenediol, 4-methoxy-6-nitro-1,3-benzenediol, 5-methyl-2-nitrophenol, 3-methyl-4-nitrophenol, 3-methoxy-4-nitrophenol, 2,5-dimethyl-4-nitrophenol, 2,3-dimethyl-4-nitrophenol, 4-methyl-5-nitro-1,2-benzenediol, and 2-methyl-4-nitro-1,3-benzenediol, available from Sigma-Aldrich (St. Louis, Mo., USA), BOC Sciences (Shirley, N.Y., USA) or Arch Bioscience Company (West Chester, Pa., USA), which can be converted to polyalkyleneoxy substituted aniline compounds by well known procedures.

Suitable starting materials for the central ring (denoted as B in the scheme above) include, but are not limited to, nitrophenols such as 2-nitro-1,4-benzenediol, 4-methoxy-3-nitrophenol, 4-methoxy-2-nitrophenol, which can be converted through procedures well known in the art to suitably substituted benzeneamines. Such substituted nitrophenols can be converted to substituted polyalkoxylated benzenamines by well-known literature procedures. For example, 4-methoxy-3-nitrophenol or 4-methoxy-2-nitrophenol can be reacted with mono-choropolyalkoxy glycols or simple ethylene oxide in presence of a suitable base to produce alkoxylated substituted nitrobenzenes, which can then be reduced using a suitable reducing agent (Hydrogen over Raney Nickel) to produce substituted alkoxylated benzeneamines. Other suitable starting materials for the central ring include, but are not limited to, benzeneamines such as 2-ethyl-5-methoxybenzenamine, 5-ethoxy-2-methoxybenzenamine, 2-ethoxy-5-ethylbenzenamine, 2-ethoxy-5-methoxybenzenamine, 2,5-diethylbenzenamine, 5-ethoxy-2-methylbenzenamine, 5-ethyl-2-methoxybenzenamine, 5-methoxy-2-methylbenzenamine, 5-ethyl-2-methylbenzenamine, 2-ethoxy-5-methylbenzenamine, 2-ethyl-5-methylbenzenamine, 3-ethoxybenzenamine, 3-ethylbenzenamine, 2-ethylbenzenamine, 3-methoxybenzenamine, 2-methoxy-5-methylbenzenamine, 3-methylbenzenamine, 2,5-dimethoxybenzenamine, 2,5-dimethylbenzenamine, 2-methylbenzenamine, 2,5-diethoxybenzenamine, 2-ethoxybenzenamine, 2-methoxybenzenamine, and benzenamine. Such nitrophenols and benzeneamines are available from Sigma-Aldrich (St. Louis, Mo., USA), or Aurora Fine Chemicals LLC, San Diego, Calif., USA.

Specifically bis-azo colorants denoted above as BA-33, BA-34 and BA-35 can be synthesized using the synthetic route shown below:

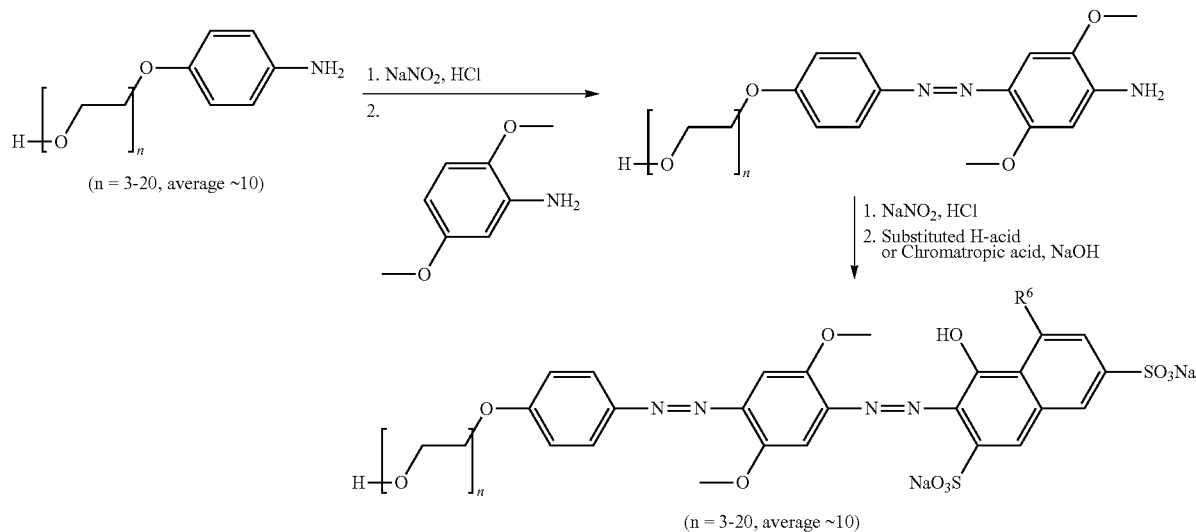

$R^6$ is selected from OH, NH$_2$ and NHC(O)$R^7$; wherein $R^7$ is independently selected from the group consisting of $C_{1-7}$ alkyl, $C_{6-10}$ aryl, and $C_{7-11}$ arylalkyl.

Alternatively, the bis-azo colorants disclosed herein may be made according to various procedures known in the art and/or in accordance with the examples of the present invention. For example, the first coupling may be carried out using polyalkyleneoxy substituted aniline compounds derived by known procedures from starting materials such as 4-methyoxy-2-nitrophenol or 4-methyl-2-nitrophenol, or 4-aminophenol which are available from VWR International, LLC (West Chester, Pa., USA).

Laundry Care Compositions

Any of the bluing agents described in the present specification may be incorporated into laundry care compositions including but not limited to laundry detergents and fabric care compositions. The laundry care compositions including laundry detergents may be in solid or liquid form, including a gel form. Such compositions may comprise one or more of said bluing agents and a laundry care ingredient. The bluing agents may be added to substrates using a variety of application techniques. For instance, for application to cellulose-containing textile substrates, the bluing agent may be included as a component of a laundry detergent. Thus, application to a cellulose-containing textile substrate actually occurs when a consumer adds laundry detergent to a washing machine. The bluing agent may be present in the laundry detergent composition in an amount from about 0.00001% to about 15% by weight of the composition, from about 0.0001% to about 10% by weight of the composition, from about 0.0001% to about 5% by weight of the composition, from about 0.0001% to about 1% by weight of the composition, and even from about 0.0001% to about 0.5% by weight of the composition.

The laundry detergent composition typically comprises a surfactant in an amount sufficient to provide desired cleaning properties. In one aspect, the laundry detergent composition may comprise, based on total laundry detergent composition weight, from about 5% to about 90% of the surfactant, from about 5% to about 70% of the surfactant, or even from about 5% to about 40% of the surfactant. The surfactant may comprise anionic, nonionic, cationic, zwitterionic and/or amphoteric surfactants. In one aspect, the detergent composition comprises anionic surfactant, nonionic surfactant, or mixtures thereof.

Fabric care compositions are typically added in the rinse cycle, which is after the detergent solution has been used and replaced with the rinsing solution in typical laundering processes. The fabric care compositions disclosed herein may be comprise a rinse added fabric softening active and a suitable bluing agent as disclosed in the present specification.

The fabric care composition may comprise, based on total fabric care composition weight, from about 1% to about 90%, or from about 5% to about 50% fabric softening active. The bluing agent may be present in the fabric care composition in an amount from about 0.5 ppb to about 50 ppm, or from about 0.5 ppm to about 30 ppm.

Suitable Laundry Care Ingredients

While not essential for the purposes of the present invention, the non-limiting list of laundry care ingredients illustrated hereinafter are suitable for use in the laundry care compositions and may be desirably incorporated in certain aspects of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular aspect. The total amount of such adjuncts may range, once the amount of dye is taken into consideration from about 90% to about 99.99999995% by weight of the laundry care composition.

The precise nature of these additional components, and levels of incorporation thereof, will depend on the physical form of the composition and the nature of the operation for which it is to be used. Suitable laundry care ingredients include, but are not limited to, fabric softening actives, polymers, for example cationic polymers, surfactants, builders, chelating agents, dye transfer inhibiting agents, dispersants, enzymes, and enzyme stabilizers, catalytic materials, organic and inorganic opacifiers, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain aspects of Applicants' compositions do not contain one or more of the following adjuncts materials: fabric softening actives, bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, or $C_{11}$-$C_{14}$ alkyl benzene sulfonic acids. In one aspect, the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially useful are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R is a $C_8$-$C_{20}$ alkyl group, n is from about 1 to 20, and M is a salt-forming cation. In one aspect, R' is $C_{10}$-$C_{18}$ alkyl, n is from about 1 to 15, and M is sodium, potassium, ammonium, alkylammonium, or alkanolammonium. In one aspect, R' is a $C_{12}$-$C_{16}$, n is from about 1 to 6 or even from about 1 to about 3 and M is sodium, potassium, ammonium, alkylammonium, or alkanolammonium, and, in one embodiment, is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3$-$M^+$ wherein R is typically a linear $C_8$-$C_{20}$ hydrocarbyl group, which may be straight chain or branched chain, and M is a water-solubilizing cation. In one aspect, R is a $C_{10}$-$C_{18}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary and branched-chain alkyl sulfates (AS); c) secondary (2,3) alkyl sulfates having suitable cations including sodium, potassium, ammonium, and mixtures thereof; d) $C_{10}$-$C_{18}$ alkyl alkoxy sulfates ($AE_xS$) wherein x is from 1-30; e) $C_{10}$-$C_{18}$ alkyl alkoxy carboxylates in one aspect, comprising 1-5 ethoxy units; f) mid-chain branched alkyl sulfates as discussed in U.S. Pat. No. 6,020,303 and U.S. Pat. No. 6,060,443; g) mid-chain branched alkyl alkoxy sulfates as discussed in U.S. Pat. No. 6,008,181 and U.S. Pat. No. 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. In one aspect, for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein IV is a $C_8$-$C_{16}$ alkyl group, m is from 2 to 4, and n ranges from about 2 to 12. In one aspect, IV is an alkyl group, which may be primary or secondary, that comprises from about 9 to 15 carbon atoms, from about 12 to 15 carbon atoms, or from about 10 to 14 carbon atoms. In one aspect, the alkoxylated fatty alcohols will also be ethoxylated materials that contain from about 2 to 12 ethylene oxide moieties per molecule, from about 3 to 10 ethylene oxide moieties per molecule, or from about 7 to 9 ethylene oxide moieties per molecule.

The alkoxylated fatty alcohol materials useful in the liquid detergent compositions herein will frequently have a hydrophilic-lipophilic balance (HLB) which ranges from about 3 to 17 from about 6 to 15, or from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, 10 to 16 carbon atoms, or is a $C_{12}$-$C_{16}$ primary alkyl. R' is a short-chain moiety, in one aspect R' may be selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12-14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, BAE$_x$, wherein x if from 1-30, as discussed in U.S. Pat. No. 6,153,577, U.S. Pat. No. 6,020,303 and U.S. Pat. No. 6,093,856; f) Alkylpolysaccharides as discussed in U.S. Pat. No. 4,565,647 to Llenado, issued Jan. 26, 1986; specifically alkylpolyglycosides as discussed in U.S. Pat. No. 4,483,780 and U.S. Pat. No. 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (in one aspect $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, or $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

Aqueous, Non-Surface Active Liquid Carrier

As noted, the laundry care compositions may be in the form of a solid, either in tablet or particulate form, including, but not limited to particles, flakes, sheets, or the like, or the compositions may be in the form of a liquid. The liquid detergent compositions may comprise an aqueous, non-surface active liquid carrier. Generally, the amount of the aqueous, non-surface active liquid carrier employed in the compositions herein will be effective to solubilize, suspend or disperse the composition components. For example, the liquid detergent compositions may comprise, based on total liquid detergent composition weight, from about 5% to about 90%, from about 10% to about 70%, or from about 20% to about 70% of the aqueous, non-surface active liquid carrier.

The most cost effective type of aqueous, non-surface active liquid carrier is typically water. Accordingly, the aqueous, non-surface active liquid carrier component will generally be mostly, if not completely, comprised of water. While other types of water-miscible liquids, such alkanols, diols, other polyols, ethers, amines, and the like, have conventionally been added to liquid detergent compositions as co-solvents or stabilizers, for purposes of the present invention, the utilization of such water-miscible liquids typically is minimized to hold down composition cost. Accordingly, the aqueous liquid carrier component of the liquid detergent products herein will generally comprise water present in concentrations ranging from about 5% to about 90%, or from about 5% to about 70%, by weight of the liquid detergent composition.

Bleaching Agents

Bleaching Agents—

The cleaning compositions of the present invention may comprise one or more bleaching agents. Suitable bleaching agents other than bleaching catalysts include photobleaches, bleach activators, hydrogen peroxide, sources of hydrogen peroxide, pre-formed peracids and mixtures thereof. In general, when a bleaching agent is used, the compositions of the present invention may comprise from about 0.1% to about 50% or even from about 0.1% to about 25% bleaching agent by weight of the subject cleaning composition. Examples of suitable bleaching agents include:

(1) photobleaches for example sulfonated zinc phthalocyanine;

(2) preformed peracids: Suitable preformed peracids include, but are not limited to, compounds selected from the group consisting of percarboxylic acids and salts, percarbonic acids and salts, perimidic acids and salts, peroxymonosulfuric acids and salts, for example, Oxzone®, and mixtures thereof. Suitable percarboxylic acids include hydrophobic and hydrophilic peracids having the formula R—(C=O)O—O-M wherein R is an alkyl group, optionally branched, having, when the peracid is hydrophobic, from 6 to 14 carbon atoms, or from 8 to 12 carbon atoms and, when the peracid is hydrophilic, less than 6 carbon atoms or even less than 4 carbon atoms; and M is a counterion, for example, sodium, potassium or hydrogen;

(3) sources of hydrogen peroxide, for example, inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts are selected from the group consisting of sodium salts of perborate, percarbonate and mixtures thereof. When employed, inorganic perhydrate salts are typically present in amounts of from 0.05 to 40 wt %, or 1 to 30 wt % of the overall composition and are typically incorporated into such compositions as a crystalline solid that may be coated. Suitable coatings include, inorganic salts such as alkali metal silicate, carbonate or borate salts or mixtures thereof, or organic materials such as water-soluble or dispersible polymers, waxes, oils or fatty soaps; and (4) bleach activators having R—(C=O)-L wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or even less than 4 carbon atoms; and L is leaving group. Examples of suitable leaving groups are benzoic acid and derivatives thereof— especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED) and nonanoyloxybenzene sulphonate (NOBS). Suitable bleach activators are also disclosed in WO 98/17767. While any suitable bleach activator may be employed, in one aspect of the invention the subject cleaning composition may comprise NOBS, TAED or mixtures thereof.

When present, the peracid and/or bleach activator is generally present in the composition in an amount of from about 0.1 to about 60 wt %, from about 0.5 to about 40 wt % or even from about 0.6 to about 10 wt % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or even 2:1 to 10:1.

Bleach Boosting Compounds—

The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

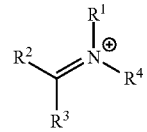

[I]

where $R^1$-$R^4$ may be a hydrogen or an unsubstituted or substituted radical selected from the group consisting of phenyl, aryl, heterocyclic ring, alkyl and cycloalkyl radicals.

Suitable bleach boosting compounds include zwitterionic bleach boosters zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are typically employed in conjunction with a peroxygen source in the bleaching systems of the present invention.

Enzyme Bleaching—

Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 g/m$^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

In one aspect, the fabric softening active ("FSA") is a quaternary ammonium compound suitable for softening fabric in a rinse step. In one aspect, the FSA is formed from a reaction product of a fatty acid and an aminoalcohol obtaining mixtures of mono-, di-, and, in one aspect, triester compounds. In another aspect, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain aspects of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

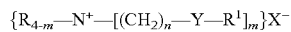

wherein each R substituent is either hydrogen, a short chain $C_1$-$C_6$, for example $C_1$-$C_3$ alkyl or hydroxyalkyl group, e.g., methyl, ethyl, propyl, hydroxyethyl, and the like, poly ($C_{2-3}$ alkoxy), for example. polyethoxy, group, benzyl, or mixtures thereof; each m is 2 or 3; each n is from 1 to about 4, or 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, or $C_{14}$-$C_{20}$ with each $R^1$ being a hydrocarbyl, or substituted hydrocarbyl group; it is acceptable for $R^1$ to be unsaturated or saturated and branched or linear and in one aspect it is linear; it is acceptable for each $R^1$ to be the same or different and typically these are the same; and $X^-$ can be any softener-compatible anion, suitable anions include, chloride, bromide, methylsulfate, ethylsulfate, sulfate, phosphate, and nitrate, in one aspect the anions are chloride or methyl sulfate. Suitable DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardened tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one aspect, the FSA comprises other actives in addition to DQA (1) or DQA. In yet another aspect, the FSA comprises only DQA (1) or DQA and is free or essentially free of any other quaternary ammonium compounds or other actives. In yet another aspect, the FSA comprises the precursor amine that is used to produce the DQA.

In another aspect of the invention, the FSA comprises a compound, identified as DTTMAC comprising the formula:

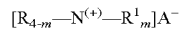

wherein each m is 2 or 3, each $R^1$ is a $C_6$-$C_{22}$, or $C_{14}$-$C_{20}$, but no more than one being less than about $C_{12}$ and then the other is at least about 16, hydrocarbyl, or substituted hydrocarbyl substituent, for example, $C_{10}$-$C_{20}$ alkyl or alkenyl (unsaturated alkyl, including polyunsaturated alkyl, also referred to sometimes as "alkylene"), in one aspect $C_{12}$-$C_{18}$ alkyl or alkenyl, and branch or unbranched. In one aspect, the Iodine Value (IV) of the FSA is from about 1 to 70; each R is H or a short chain $C_1$-$C_6$, or $C_1$-$C_3$ alkyl or hydroxyalkyl group, e.g., methyl, ethyl, propyl, hydroxyethyl, and the like, benzyl, or $(R^2O)_{2-4}H$ where each $R^2$ is a $C_{1-6}$ alkylene group; and $A^-$ is a softener compatible anion, suitable anions include chloride, bromide, methylsulfate, ethylsulfate, sulfate, phosphate, or nitrate; in one aspect the anions are chloride or methyl sulfate.

Examples of these FSAs include dialkydimethylammonium salts and dialkylenedimethylammonium salts such as ditallowdimethylammonium and ditallowdimethylammonium methylsulfate. Examples of commercially available dialkylenedimethylammonium salts usable in the present invention are di-hydrogenated tallow dimethyl ammonium chloride and ditallowdimethyl ammonium chloride available from Degussa under the trade names Adogen® 442 and Adogen® 470 respectively. In one aspect, the FSA comprises other actives in addition to DTTMAC. In yet another aspect, the FSA comprises only compounds of the DTTMAC and is free or essentially free of any other quaternary ammonium compounds or other actives.

In one aspect, the FSA comprises an FSA described in U.S. Pat. Pub. No. 2004/0204337 A1, published Oct. 14, 2004 to Corona et al., from paragraphs 30-79. In another aspect, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one aspect, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one aspect, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another aspect of the invention provides for a rinse added fabric softening composition further comprising a cationic starch. Cationic starches are disclosed in US 2004/0204337 A1. In one aspect, the rinse added fabric softening composition comprises from about 0.1% to about 7% of cationic starch by weight of the fabric softening composition. In one aspect, the cationic starch is HCP401 from National Starch.

Builders—

The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—

The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—

The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—

The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—

The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, ß-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—

Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Process of Making

The liquid detergent compositions are in the form of an aqueous solution or uniform dispersion or suspension of surfactant, bluing agent, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, or from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a process for preparing such compositions, a liquid matrix is formed containing at least a major proportion, or even substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In one aspect of forming the liquid detergent compositions, the bluing agent is first combined with one or more liquid components to form a bluing agent premix, and this bluing agent premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the bluing agent premix and the enzyme component are added at a final stage of component additions. In another aspect, the bluing agent is encapsulated prior to addition to the detergent composition, the encapsulated bluing agent is suspended in a structured liquid, and the suspension is added to a composition formulation containing a substantial portion of the balance of components of the laundry detergent composition.

As noted previously, the detergent compositions may be in a solid form. Suitable solid forms include tablets and particulate forms, for example, granular particles, flakes or sheets. Various techniques for forming detergent compositions in such solid forms are well known in the art and may be used herein. In one aspect, for example when the composition is in the form of a granular particle, the bluing agent is provided in particulate form, optionally including additional but not all components of the laundry detergent composition. The bluing agent particulate is combined with one or more additional particulates containing a balance of components of the laundry detergent composition. Further, the bluing agent, optionally including additional but not all components of the laundry detergent composition, may be provided in an encapsulated form, and the bluing agent encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, for example in a conventional fabric laundering automatic washing machine, to form such aqueous laundering solutions. The aqueous washing solution so formed is then contacted, typically under agitation, with the fabrics to be laundered therewith.

An effective amount of the liquid detergent compositions herein added to water to form aqueous laundering solutions can comprise amounts sufficient to form from about 500 to 7,000 ppm of composition in aqueous washing solution, or from about 1,000 to 3,000 ppm of the detergent compositions herein will be provided in aqueous washing solution.

Method of Use

Certain of the consumer products disclosed herein can be used to clean or treat a situs inter alia a surface or fabric. Typically at least a portion of the situs is contacted with an embodiment of Applicants' consumer product, in neat form or diluted in a liquor, for example, a wash liquor and then the situs may be optionally washed and/or rinsed. In one aspect, a situs is optionally washed and/or rinsed, contacted with an aspect of the consumer product and then optionally washed and/or rinsed. For purposes of the present invention, washing includes but is not limited to, scrubbing, and mechanical agitation. The fabric may comprise most any fabric capable of being laundered or treated in normal consumer use conditions. Liquors that may comprise the disclosed compositions may have a pH of from about 3 to about 11.5. Such compositions are typically employed at concentrations of from about 500 ppm to about 15,000 ppm in solution. When the wash solvent is water, the water temperature typically ranges from about 5° C. to about 90° C. and, when the situs comprises a fabric, the water to fabric ratio is typically from about 1:1 to about 30:1. Employing one or more of the aforementioned methods results in a treated situs.

EXAMPLES

The following examples are provided to further illustrate the bluing agents of the present invention; however, they are not to be construed as limiting the invention as defined in the claims appended hereto. In fact, it will be apparent to those skilled in the art that various modifications and variations can be made in this invention without departing from the scope or spirit of the invention. All parts and percents given in these examples are by weight unless otherwise indicated.

Sample Preparation and Test Methods

A. Sample Preparation

The following bis-azo colorant is prepared as described herein. The UV-visible spectrum of a colorant is determined by dissolving it in a suitable solvent, typically water or methanol, at a concentration that gives an absorbance at the lambda max of less than 1.0 at a path length of 1.0 cm. A Beckman Coulter DU 800 or other similar spectrophotometer is used to measure the UV-visible spectrum and determine the lambda max ("$\lambda_{max}$") of each sample.

Example 1

To a cold (0-5° C.) solution of p-polyalkyleneoxyphenylamine (27.45 grams in 100 ml of water), containing sufficient hydrochloric acid to give a pH of 1, are added 3.58 grams of sodium nitrite. The mixture is stirred for 2 hours. The mixture is then added to a cold solution of 7.65 grams of 2,5-dimethoxyaniline in dilute hydrochloric acid to give an orange colored product. This product is further diazotized by adding sufficient hydrochloric acid to keep the pH at 1 followed by 3.58 grams of sodium nitrite. After stirring 2 hours at 0-5° C., the mixture is added to an aqueous solution of 13.96 grams of N-acetyl J acid along with sufficient sodium hydroxide to dissolve the N-acetyl J acid. During the addition of the diazonium salt, the pH is kept at 10-12 by the addition of aqueous sodium hydroxide solution. This resulted in a violet colored product represented as Formula BA 1 herein.

B. Test Methods

I. Method for Determining Hueing Deposition (HD) for Dye from a Wash Solution

Unbrightened multi-fiber fabric swatches are stripped prior to use by washing at 49° C. two times with heavy duty liquid laundry detergent nil brightener (1.55 g/L in aqueous solution). A concentrated stock solution of each dye to be tested is prepared in a solvent selected from dimethyl sulfoxide, ethanol or 50:50 ethanol:water. Dye stocks are added to beakers containing 400 mL detergent in water (heavy duty liquid laundry detergent nil brightener, 1.55 g per liter) to produce a wash solution with an absorbance of 0.1 AU (±0.01 AU; 1.0 cm cuvette) at the $\lambda_{max}$ of the dye. Hardness level is adjusted in the wash and rinse to 6 gpg by addition of an appropriate volume of 10,000 gpg Ca:Mg (3:1) hardness stock solution prepared in deionized water.

A 125 mL aliquot of each wash solution is placed into a separate 250 mL Erlenmeyer flask containing four swatches. The flasks are placed on a Model 75 wrist action shaker (Burrell Scientific, Inc., Pittsburgh, Pa.) and agitated at the maximum setting for 12 minutes, after which the wash solution is removed by aspiration, 125 mL of rinse water (6 gpg) is added before agitating 4 more minutes. The rinse is removed by aspiration and the fabric swatches are spun dry (Mini Countertop Spin Dryer, The Laundry Alternative Inc., Nashua, N.H.) for 5 minutes, then placed in the dark to dry.

L*, a*, and b* values for cotton, nylon and polyester are measured on the dry swatches using a LabScan XE reflectance spectrophotometer (HunterLabs, Reston, Va.; D65 illumination, 10° observer, UV light excluded). The L*, a*, and b* values of the 4 swatches generated for each dye are averaged and the hueing deposition (HD) of each dye is calculated for each fabric type using the following equation:

$$HD=DE^*=((L^*_c-L^*_s)^2+(a^*_c-a^*_s)^2+(b^*_c-b^*_s)^2)^{1/2}$$

wherein the subscripts c and s respectively refer to the control, i.e., the fabric washed in detergent with no dye, and the sample, i.e., the fabric washed in detergent containing dye.

II. Method for Determining Cotton to Nylon Selectivity Ratio

The selectivity ratio parameter is calculated only when at least one of the individual deposition (HD) values for cotton or polyamide is ≥2.0. The Cotton to Nylon Selectivity Ratio (SR) is calculated using the following:

SR = Cotton $HD$/Nylon $HD$

III. Method for Determining Absolute Hue Angle ($\theta_A$)

The L*, a*, and b* values of the four swatches generated for a dye from Test Method I are averaged and the a* value and b* value for cotton is used to determine the absolute hue angle for said dye. Typical color descriptors associated with such hue angles are 90° (yellow), 180° (green), 270° (blue), and 360° or 0° (red), The absolute hue angle is calculated using the following formula in Microsoft Excel:

=IF($B1$<0,360+DEGREES($A$ TAN 2($A1$,$B1$)), DEGREES($A$ TAN 2($A1$,$B1$)))

where B1 refers to the cell containing the average b* value and A1 refers to the cell containing the average a* value.

Examples

Performance Example

The performance of nine different bis-azo bluing agents, three comparative and six inventive, are tested and Hueing Deposition, and Selectivity Ratio are assessed according to the equations disclosed above in the methods. The results are given in the Table immediately below.

Test Results

| Dye | $\Delta E^*_{Cotton}$ | $\Delta E^*_{Nylon}$ | Selectivity Ratio ($\Delta E^*_{Cotton}$/$\Delta E^*_{Nylon}$) |
|---|---|---|---|
| 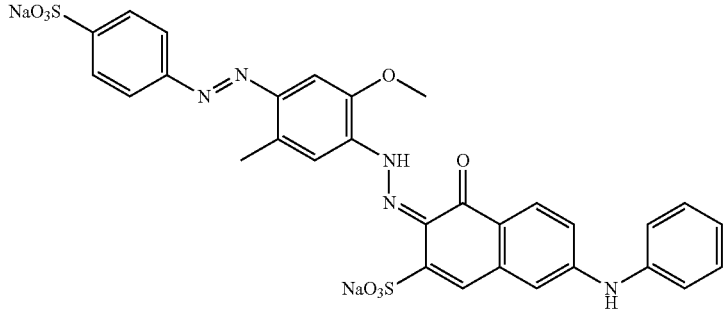<br>Direct Violet 9 (comparative) | 29.24 | 19.36 | 1.51 |
| 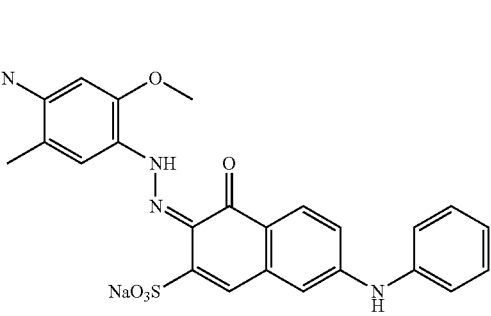<br>WO 2010/151906 A2, Formula BA63,<br>n = 3-20, average ~10 (comparative) | 19.26 | 14.91 | 1.29 |
| 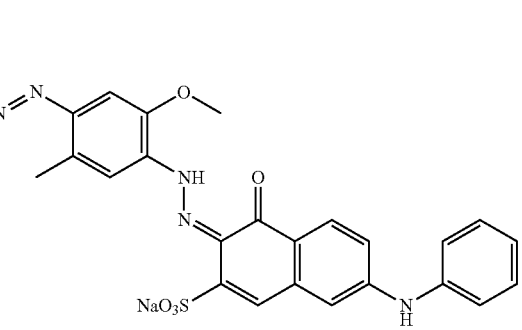<br>WO 2010/151906 A2, Formula BA61,<br>Example 18 (comparative) | 12.03 | 21.15 | 0.57 |

-continued
| Dye | ΔE*$_{Cotton}$ | ΔE*$_{Nylon}$ | Selectivity Ratio (ΔE*$_{Cotton}$/ΔE*$_{Nylon}$) |
|---|---|---|---|
| 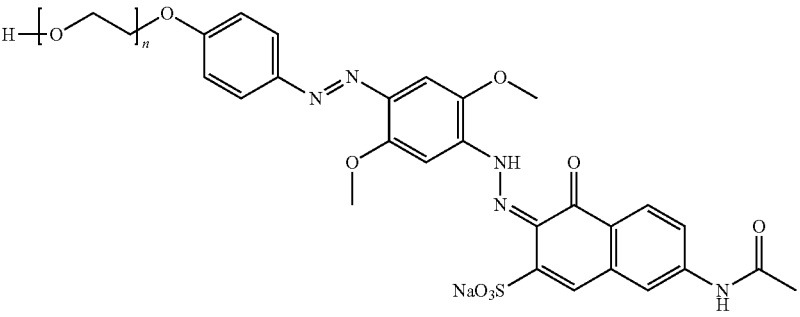<br>n = 3-20, average ~10 | 19.81 | 5.32 | 3.72 |
| 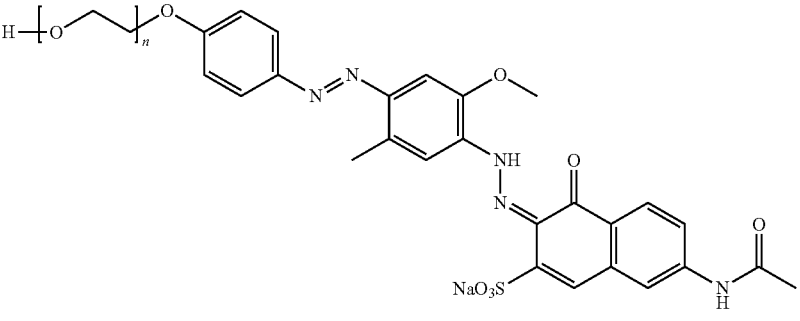<br>n = 3-20, average ~10 | 24.57 | 6.58 | 3.73 |
| 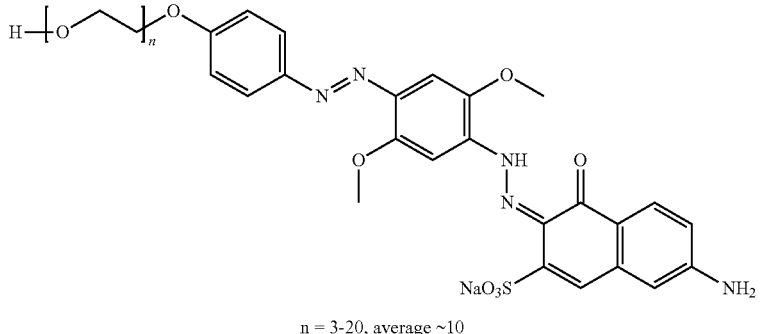<br>n = 3-20, average ~10 | 24.57 | 4.33 | 5.67 |
| 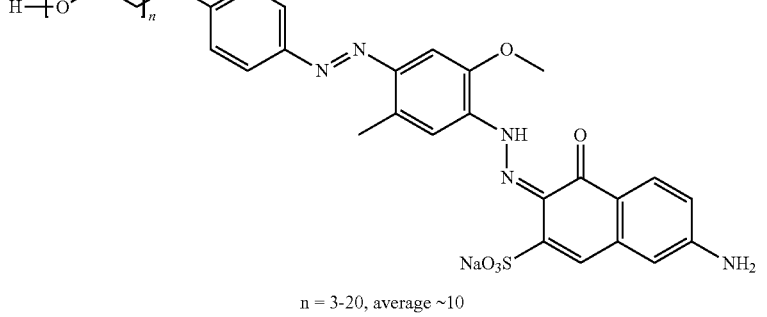<br>n = 3-20, average ~10 | 23.07 | 3.79 | 6.09 |

| Dye | ΔE*$_{Cotton}$ | ΔE*$_{Nylon}$ | Selectivity Ratio (ΔE*$_{Cotton}$/ΔE*$_{Nylon}$) |
|---|---|---|---|
| 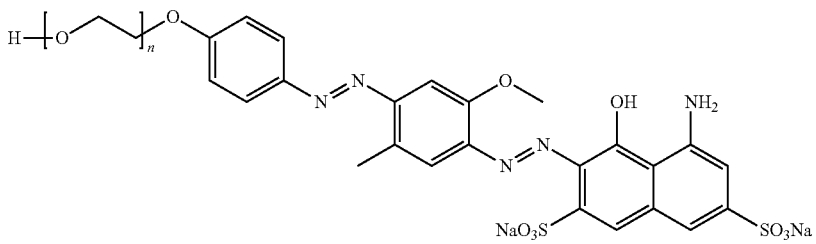 n = 3-20, average ~10 | 7.26 | 0.49 | 14.8 |
| 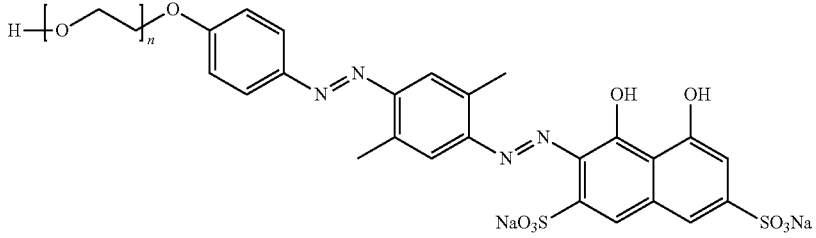 n = 3-20, average ~10 | 6.82 | 1.66 | 4.10 |

All the dyes show some level of deposition on cotton and nylon, The Selectivity Ratio (SR) for the comparative bisazo bluing agents lie within a range of 0.5 to about 1.5. Substituting an acetyl or H for the phenyl ring in N-phenyl J-acid increases the SR to above 3.5 and above 5.5, respectively. Moreover, replacing the J-acid moiety with an H-acid or chromotropic acid group also leads to improved SR values.

Thus the compositions and methods of the invention provide good deposition on cellulosic fabrics, and improved selectivity ratios, avoiding problematic overhueing even on synthetic fabrics such as nylon.

Exemplary Detergent Formulations

Formulations 1a-1l: Liquid Detergent Formulations

Tables 4A and 4B provide examples of liquid detergent formulations which include at least one bluing agent of the present invention. The formulations are shown in Table 4A as Formulations 1a through 1f and in Table 4B as Formulations 1g through 1l.

TABLE 4A

Liquid Detergent Formulations Comprising the Inventive Bluing Agent

| Ingredient | 1a wt % | 1b wt % | 1c wt % | 1d wt % | 1e wt % | 1f[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 2.5% |
| amylase | 0.2% | 0.2% | 0.2% | | | 0.3% |
| lipase | | | | 0.2% | | |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |

TABLE 4A-continued

Liquid Detergent Formulations Comprising the Inventive Bluing Agent

| Ingredient | 1a wt % | 1b wt % | 1c wt % | 1d wt % | 1e wt % | 1f[5] wt % |
|---|---|---|---|---|---|---|
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| First bis-azo colorant[6] | | 0.001% | 0.001% | | 0.0005% | |
| Second bis-azo colorant[6] | 0.013% | | 0.005% | 0.003% | | 0.001% |
| water | balance 100.0% | balance 100.0% | balance 100.0% | balance 100.0% | balance 100.0% | balance 100.0% |

TABLE 4B

Liquid Detergent Formulations Comprising the Inventive Bluing Agent

| Ingredient | 1g wt % | 1h wt % | 1i wt % | 1j wt % | 1k wt % | 1l[5] wt % |
|---|---|---|---|---|---|---|
| sodium alkyl ether sulfate | 14.4% | 14.4% | | 9.2% | 5.4% | |
| linear alkylbenzene sulfonic acid | 4.4% | 4.4% | 12.2% | 5.7% | 1.3% | 22.0% |
| alkyl ethoxylate | 2.2% | 2.2% | 8.8% | 8.1% | 3.4% | 18.0% |
| amine oxide | 0.7% | 0.7% | 1.5% | | | |
| citric acid | 2.0% | 2.0% | 3.4% | 1.9% | 1.0% | 1.6% |
| fatty acid | 3.0% | 3.0% | 8.3% | | | 16.0% |
| protease | 1.0% | 1.0% | 0.7% | 1.0% | | 1.7% |
| amylase | 0.2% | 0.2% | 0.2% | | | 0.6% |
| lipase | | | | 0.2% | | 0.2% |
| borax | 1.5% | 1.5% | 2.4% | 2.9% | | |
| calcium and sodium formate | 0.2% | 0.2% | | | | |
| formic acid | | | | | | 1.1% |
| amine ethoxylate polymers | 1.8% | 1.8% | 2.1% | | | 3.2% |
| sodium polyacrylate | | | | | 0.2% | |
| sodium polyacrylate copolymer | | | | 0.6% | | |
| DTPA[1] | 0.1% | 0.1% | | | | 0.9% |
| DTPMP[2] | | | 0.3% | | | |
| EDTA[3] | | | | | 0.1% | |
| fluorescent whitening agent | 0.15% | 0.15% | 0.2% | 0.12% | 0.12% | 0.2% |
| ethanol | 2.5% | 2.5% | 1.4% | 1.5% | | |
| propanediol | 6.6% | 6.6% | 4.9% | 4.0% | | 15.7% |
| sorbitol | | | | 4.0% | | |
| ethanolamine | 1.5% | 1.5% | 0.8% | 0.1% | | 11.0% |
| sodium hydroxide | 3.0% | 3.0% | 4.9% | 1.9% | 1.0% | |
| sodium cumene sulfonate | | | 2.0% | | | |
| silicone suds suppressor | | | 0.01% | | | |
| perfume | 0.3% | 0.3% | 0.7% | 0.3% | 0.4% | 0.6% |
| Non-tinting dyes[4] | 0.0001% | 0.001% | 0.008% | 0.03% | 0.015% | 0.05% |
| First bis-azo colorant[6] | 0.01% | | 0.005% | | 0.005% | |
| Second bis-azo colorant[6] | | 0.01% | 0.02% | 0.003% | | 0.012% |
| opacifier[7] | | 0.5% | | | | |
| water | balance 100.0% | balance 100.0% | balance 100.0% | balance 100.0% | balance 100.0% | balance 100.0% |

Footnotes for Formulations 1a-1:
[1] diethylenetriaminepentaacetic acid, sodium salt
[2] diethylenetriaminepentakismethylenephosphonic acid, sodium salt
[3] ethylenediaminetetraacetic acid, sodium salt
[4] a non-tinting dye or mixture of non-tinting dyes used to adjust formula color
[5] compact formula, packaged as a unitized dose in polyvinyl alcohol film
[6] Bis-azo colorants selected from BA1-35
[7] Acusol OP301

Formulations 2a-2e: Granular Detergent Formulations

Table 5 provides examples of granular detergent formulations which include at least one bluing agent of the present invention. The formulations are shown in Table 5 as Formulations 2a through 2e.

TABLE 5

Granular Detergent Formulations Comprising the Inventive Bluing Agent

| Ingredient | 2a wt % | 2b wt % | 2c wt % | 2d wt % | 2e wt % |
|---|---|---|---|---|---|
| Na linear alkylbenzene sulfonate | 3.4% | 3.3% | 11.0% | 3.4% | 3.3% |
| Na alkylsulfate | 4.0% | 4.1% | | 4.0% | 4.1% |
| Na alkyl sulfate (branched) | 9.4% | 9.6% | | 9.4% | 9.6% |
| alkyl ethoxylate | | | 3.5% | | |
| type A zeolite | 37.4% | 35.4% | 26.8% | 37.4% | 35.4% |
| sodium carbonate | 22.3% | 22.5% | 35.9% | 22.3% | 22.5% |
| sodium sulfate | 1.0% | | 18.8% | 1.0% | |
| sodium silicate | | | 2.2% | | |
| protease | 0.1% | 0.2% | | 0.1% | 0.2% |
| sodium polyacrylate | 1.0% | 1.2% | 0.7% | 1.0% | 1.2% |
| carboxymethylcellulose | | | 0.1% | | |
| PEG 600 | | 0.5% | | | 0.5% |
| PEG 4000 | | 2.2% | | | 2.2% |
| DTPA | 0.7% | 0.6% | | 0.7% | 0.6% |
| fluorescent whitening agent | 0.1% | 0.1% | 0.1% | 0.1% | 0.1% |
| sodium percarbonate | | 5.0% | | | 5.0% |
| sodium nonanoyloxybenzenesulfonate | | 5.3% | | | 5.3% |
| silicone suds suppressor | 0.02% | 0.02% | | 0.02% | 0.02% |
| perfume | 0.3% | 0.3% | 0.2% | 0.3% | 0.3% |
| First bis-azo colorant[1] | 0.004% | | 0.001% | | 0.02% |
| Second bis-azo colorant[1] | | 0.006% | 0.002% | 0.004% | |
| water and miscellaneous | balance 100.0% | balance 100.0% | Balance 100.0% | balance 100.0% | balance 100.0% |

[1] Bis-azo colorants selected from BA1-35.

Exemplary Fabric Care Compositions

Formulations 3a-3d: Liquid Fabric Care Compositions

Table 6 provides examples of liquid fabric care compositions which include at least one bluing agent of the present invention. The compositions are shown in Table 6 as Formulations 3a through 3d.

TABLE 6

Liquid Fabric Care Compositions Comprising the Inventive Bluing Agent

| Ingredients | 3a | 3b | 3c | 3d |
|---|---|---|---|---|
| Fabric Softening Active [a] | 13.70% | 13.70% | 13.70% | 13.70% |
| Ethanol | 2.14% | 2.14% | 2.14% | 2.14% |
| Cationic Starch [b] | 2.17% | 2.17% | 2.17% | 2.17% |
| Perfume | 1.45% | 1.45% | 1.45% | 1.45% |
| Phase Stabilizing Polymer [c] | 0.21% | 0.21% | 0.21% | 0.21% |
| Calcium Chloride | 0.147% | 0.147% | 0.147% | 0.147% |
| DTPA [d] | 0.007% | 0.007% | 0.007% | 0.007% |
| Preservative [e] | 5 ppm | 5 ppm | 5 ppm | 5 ppm |
| Antifoam [f] | 0.015% | 0.015% | 0.015% | 0.015% |
| First bis-azo colorant [i] | 30 ppm | | | 15 ppm |
| Second bis-azo colorant [i] | | 30 ppm | | |
| Third bis-azo colorant [i] | | | 30 ppm | 15 ppm |
| Tinopal CBS-X [g] | 0.2 | 0.2 | 0.2 | 0.2 |
| Ethoquad C/25 [h] | 0.26 | 0.26 | 0.26 | 0.26 |
| Ammonium Chloride | 0.1% | 0.1% | 0.1% | 0.1% |
| Hydrochloric Acid | 0.012% | 0.012% | 0.012% | 0.012% |
| Deionized Water | Balance | Balance | Balance | Balance |

[a] N,N-di(tallowoyloxyethyl)-N,N-dimethylammonium chloride.
[b] Cationic starch based on common maize starch or potato starch, containing 25% to 95% amylose and a degree of substitution of from 0.02 to 0.09, and having a viscosity measured as Water Fluidity having a value from 50 to 84.
[c] Copolymer of ethylene oxide and terephthalate having the formula described in U.S. Pat. No. 5,574,179 at col. 15, lines 1-5, wherein each X is methyl, each n is 40, u is 4, each $R^1$ is essentially 1,4-phenylene moieties, each $R^2$ is essentially ethylene, 1,2-propylene moieties, or mixtures thereof.
[d] Diethylenetriaminepentaacetic acid.
[e] KATHON ® CG available from Rohm and Haas Co.
[f] Silicone antifoam agent available from Dow Corning Corp. under the trade name DC2310.
[g] Disodium 4,4'-bis-(2-sulfostyryl) biphenyl, available from Ciba Specialty Chemicals.
[h] Cocomethyl ethoxylated [15] ammonium chloride, available from Akzo Nobel.
[i] Bis-azo colorants selected from BA1-35.

Accordingly, the present invention provides a bluing agent for textile and/or paper substrates comprising at least one chromophore component that comprises a bis-azo colorant and at least one polymeric component. A laundry detergent composition and a rinse added fabric softener containing such a bluing agent is also contemplated herein.

While particular aspects of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

We claim:

1. A laundry care composition comprising a laundry care ingredient and from about 0.00001 wt % to about 0.5 wt % of a bluing agent, said bluing agent comprising:
   (a) at least one chromophore component that comprises a bis-azo colorant, and
   (b) at least one polymeric component selected from a polyalkyleneoxy and a capped polyalkyleneoxy;
   wherein said chromophore and said polymeric component are covalently bound to one another and wherein the bluing agent is

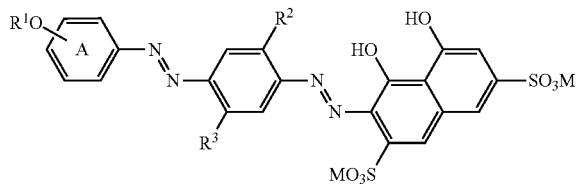

wherein $R^1$ is selected from H, alkyl, hydroxyalkyl, polyalkyleneoxy and a capped polyalkyleneoxy; $R^2$ and $R^3$ are independently selected from the group consisting of H, alkyl, alkoxy, alkyleneoxy, capped alkyleneoxy, polyalkyleneoxy and capped polyalkyleneoxy; wherein said capping groups are independently selected from $C(O)R^5$ and $R^5$; $R^5$ is independently selected from the group consisting of $C_{1-7}$ alkyl, $C_{6-10}$ aryl, and $C_{7-11}$ arylalkyl; wherein the A ring may be further substituted with one or more groups selected from the group consisting of $C_{1-8}$ alkyl, $C_{1-8}$ alkoxy, nitro and $OR^6$; wherein $R^6$ is selected from the group consisting of H, hydroxyalkyl, a polyalkyleneoxy and a capped polyalkyleneoxy; wherein each M is independently selected from the group consisting of an alkali metal cation, an ammonium ion and an alkaline earth metal cation.

2. A composition according to claim 1 in which in the bluing agent $R^2$ and $R^3$ are independently selected from the group consisting of H, alkyl, alkoxy, alkyleneoxy, and capped alkyleneoxy.

3. A composition according to claim 1 in which in the bluing agent, $R^2$ and $R^3$ are independently selected from the group consisting of H, $C_{1-4}$ alkyl, and $C_{1-4}$ alkoxy.

4. A composition according to claim 1 in which in the bluing agent, $R^1$ is a polyoxyalkylene chain having from 2 to 100 repeating units.

5. A composition according to claim 4 in which in the bluing agent, $R^1$ is a polyoxyalkylene chain having from 4 to 50 repeating units.

6. A laundry care composition according to claim 5, wherein the polyoxyalkylene chain comprises ethyleneoxide for at least 50% of the units.

7. A laundry care composition according to claim 1 wherein the bluing agent's chromophore exhibits an absorbance spectrum maximum in water of from about 560 nanometers to about 640 nanometers.

8. A laundry care composition according to claim 1 wherein the bluing agent exhibits an absolute hue angle in the range of 220° to 320.

9. A laundry care composition according to claim 5 wherein $R^2$ is alkyl and $R^3$ is selected from $C_{1-4}$ alkyl and $C_{1-4}$ alkoxy groups.

10. A laundry care composition according to claim 5 wherein $R^2$ and $R^3$ are $C_{1-4}$ alkoxy groups.

11. A laundry care composition according to claim 3, wherein the A ring is substituted with another group selected from alkyl, alkoxy and $OR^1$.

12. A laundry care composition according to claim 1 additionally comprising a first wash lipase.

13. A laundry care composition according to claim 1 wherein the composition additionally comprises dye transfer inhibiting agents selected from the group consisting of:
   (a) polyvinylpyrrolidone polymers;
   (b) polyamine N-oxide polymers;
   (c) copolymers of N-vinylpyrrolidone and N-vinylimidazole;
   (d) polyvinyloxazolidones;
   (e) polyvinylimidazoles; and
   (f) mixtures thereof.

14. A laundry care composition according to claim 1 additionally comprising a soil suspension polymer selected from the group consisting of:
   (a) amphiphilic alkoxylated polyamines;
   (b) amphiphilic graft co-polymers;
   (c) zwitterionic soil suspension polymer; and
   (d) mixtures thereof.

15. A laundry care composition according to claim 1 wherein the composition additionally comprises imine bleach boosting compounds having the general structure:

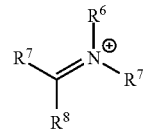

where $R^6$-$R^8$ may be a hydrogen or an unsubstituted or substituted radical selected from the group consisting of phenyl, aryl, heterocyclic ring, alkyl and cycloalkyl radicals.

16. A laundry care composition according to claim 1 wherein the composition is a free-flowing solid particulate laundry detergent composition, a liquid laundry detergent composition or a liquid rinse-added fabric enhancer composition, optionally in unitized dose form.

* * * * *